United States Patent

[11] 3,618,130

| [72] | Inventor | Valdis E. Garuts |
| | | Beaverton, Oreg. |
| [21] | Appl. No. | 845,217 |
| [22] | Filed | July 28, 1969 |
| [45] | Patented | Nov. 2, 1971 |
| [73] | Assignee | Tektronix, Inc. |
| | | Beaverton, Oreg. |

[54] HIGH EFFICIENCY REGULATED OSCILLATOR CIRCUIT HAVING A SUBSTANTIALLY SINUSOIDAL WAVEFORM
18 Claims, 2 Drawing Figs.

[52] U.S. Cl. ........................................... 331/109, 321/2, 331/112, 331/148, 331/183
[51] Int. Cl. ....................................... H03b 3/02, H03k 3/30
[50] Field of Search............................ 331/112, 109, 113.1, 148, 183; 321/2

[56] References Cited
UNITED STATES PATENTS

| 2,967,989 | 1/1961 | Eno et al. ............ | 331/113.1 X |
| 3,114,096 | 12/1963 | Projain ................ | 321/2 |
| 3,435,320 | 3/1969 | Lee et al. ............. | 331/112 X |

*Primary Examiner*—Roy Lake
*Assistant Examiner*—Siegfried H. Grimm
*Attorney*—Buckhorn, Blore, Klarquist and Sparkman ABSTRACT: A regulated oscillator circuit for producing a predetermined high voltage output employs a switching transistor for supplying current to a high-voltage transformer and for receiving feedback current from the same high-voltage transformer. A diode is placed in series between the switching transistor and the transformer primary such that the transistor conducts substantially no current at times during predetermined half-cycles of oscillator operation. However, the transistor is switched by feedback to an on condition during each nonconducting half-cycle whereby it will deliver current to the transformer in a zero voltage condition. The period during which current is delivered to the transformer is determined by a control circuit which turns off the transistor at a selected time during each cycle of operation in accordance with the output level produced. A voltage doubler circuit is driven by the transformer and provides a DC output level.

VALDIS E. GARUTS
INVENTOR

BY
BUCKHORN, BLORE, KLARQUIST & SPARKMAN
ATTORNEYS

HIGH EFFICIENCY REGULATED OSCILLATOR CIRCUIT HAVING A SUBSTANTIALLY SINUSOIDAL WAVEFORM

BACKGROUND OF THE INVENTION

Several circuits are available for producing a high voltage DC output for use by a cathode-ray tube or the like. A flyback type of supply is useful when the appropriate signals are available. This type of supply is generally characterized by a highly asymmetrical primary voltage waveform and an unregulated output. If an accurate source of high DC voltage is desired, a regulated sine wave oscillator is frequently utilized employing feedback for biasing oscillator operation at a desired output level. However, the active device in such a circuit is usually characterized by substantial power dissipation, particularly since the bias thereof is adjustable through a regulation circuit.

Another alternative for producing a regulated DC output includes a switching circuit such as a duty factor regulator employed in conjunction with a high-voltage supply. Such an arrangement has the advantage of lower power dissipation in regulation inasmuch as the regulating elements are either heavily conducting, with no voltage thereacross, or are nonconducting with no current therethrough. However, switching currents tend to be quite large. Capacitances are generally forcibly charged, and the currents are determined by how much a given transistor or the like can draw.

SUMMARY OF THE INVENTION

According to the present invention, a regulated oscillator circuit comprises a switching means and means for applying feedback for turning on the switching means after the voltage across the switching means has swung to a zero value. Current then flows through the switching means for a period of time dependent upon the output level which is to be achieved. During this time, the voltage across the switching means remains substantially zero. When sufficient energy is delivered through the switching means, the switching means is turned off at a selected time during each cycle of operation of the circuit and the voltage across the switching means is allowed to rise. In a preferred form of the present invention, a rectifier circuit, which is supplied energy from the switching means, develops a voltage level, and if this voltage level is too high or too low, the period during which the switching means conducts current during each cycle of operation is decreased or increased accordingly. In a preferred embodiment of the present invention, the switching means is connected in series with a primary winding on a high-voltage transformer, and a diode is connected therebetween such that the voltage across the switching means drops to zero at each half-cycle of circuit oscillation. During the time the voltage across the switching means is zero, feedback is applied thereto for turning the switching means on such that current can flow therethrough. A control circuit, driven from another winding on the high voltage transformer, then turns the switching means off at a selected time during each cycle of operation in accordance with the output voltage developed.

The circuit generates nearly a sine wave voltage output despite the fact that it operates in a switching mode. The high-voltage transformer employed is allowed to swing at a rate controlled by its tuned frequency. Capacitances are not forcibly charged, keeping switching currents low, and a relatively high capacitance transformer of standard high voltage type can be used. Thus, current levels are reduced, and the substantially sine wave output is appropriate for driving a voltage multiplier circuit which is desirably employed according to the present invention. However, since a switching means is utilized, the power dissipation is minimized. The switching means suitably comprises a transistor operated in a switching mode.

It is an object of the present invention to provide an improved regulated oscillator circuit capable of producing a high voltage DC output.

It is another object of the present invention to provide an improved regulated oscillator circuit characterized by a lower power dissipation.

It is another object of the present invention to provide an improved regulated oscillator circuit characterized by comparatively low switching currents.

It is another object of the present invention to provide an improved regulated oscillator circuit adapted for providing a high voltage DC output wherein the regulation portion of the circuit is substantially insensitive to oscillator ripple.

It is another object of the present invention to provide an improved regulated oscillator circuit capable of supplying a high voltage DC output and employing a voltage multiplier circuit receiving a substantially sine wave AC voltage produced in said oscillator circuit, but wherein such oscillator circuit operates in a switching mode to provide low power dissipation.

It is another object of the present invention to provide an improved regulated oscillator circuit incorporating runaway protection.

The subject matter which I regard as my invention is particularly pointed out and distinctly claimed in the concluding portion of this specification. The invention, however, both as to organization and method of operation, together with further advantages thereof, may best be understood by reference to the following description taken in connection with the accompanying drawings wherein like reference characters refer to like elements.

DRAWINGS

FIG. 1 is a schematic diagram of an oscillator circuit according to the present invention; and FIG. 2 is a chart of waveforms for illustrating operation of the FIG. 1 circuit.

DETAILED DESCRIPTION

Figure 1:
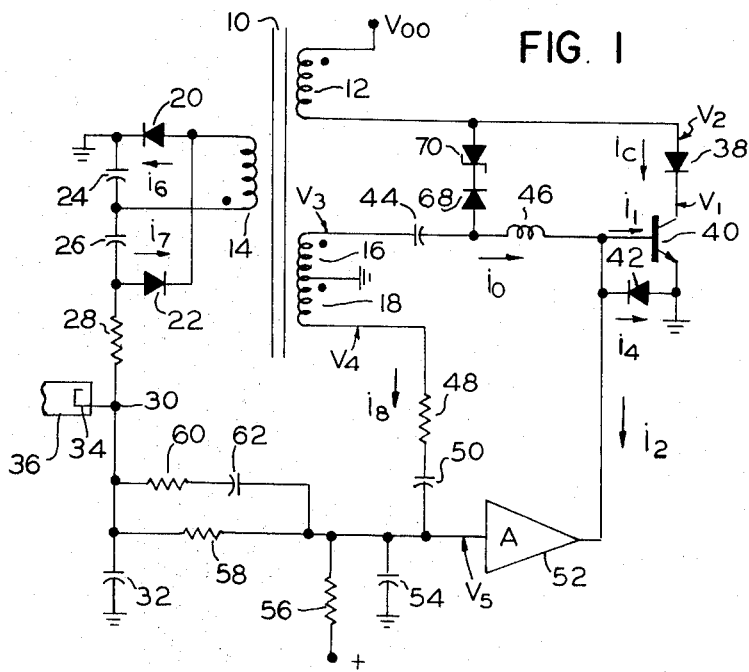

Referring to FIG. 1, an oscillator circuit according to the present invention includes a high-voltage transformer 10 having a primary winding 12 thereon, an output winding 14, and a center tapped winding having a feedback winding portion 16 and a control portion 18. The transformer may be of a high voltage type frequently used in power supplies for cathode-ray tubes. The output winding 14 is connected to a voltage doubler circuit comprising diodes 20 and 22 and capacitors 24 and 26. Diode 20 is coupled between a first end of winding 14 and ground with the anode of diode 20 being connected to winding 14. The remaining or dotted end of the transformer is connected to a first terminal of capacitor 24, the opposite terminal of which is grounded. The cathode of diode 22 is also connected to the first mentioned end of winding 14, and the anode of diode 22 is connected to a first terminal of capacitor 26 while the remaining terminal of capacitor 26 is connected to capacitor 24. A resistor 28, employed for filtering, couples the junction between diode 22 and capacitor 26 to a DC output terminal 30. A filter capacitor 32 is disposed between terminal 30 and ground.

The cathode 34 of a cathode-ray tube 36 is suitably connected to terminal 30. As oscillations occur in transformer 10, it will be recognized that diodes 20 and 22 alternately charge capacitors 24 and 26 in a series aiding relation so that the junction between capacitor 26 and diode 22 can reach a voltage substantially equal to the peak-to-peak voltage developed across winding 14. This voltage is negative in polarity with respect to ground and is applied to the cathode 34 of cathode-ray tube 36 through resistor 28.

A first, dotted end of primary winding 12 is connected to a DC voltage supply $V_{oo}$, and the undotted end thereof is coupled through a unilateral conductor means or diode 38 to the collector of a transistor 40, the emitter of which is grounded. The cathode of diode 38 is connected to the collector of transistor 40. Transistor 40, which is suitably of the NPN-type, here operates as a switching device. That is, transistor 40 has substantially zero voltage thereacross as current flows therethrough, or alternatively, the transistor is nonconducting. A diode 42 is coupled between the base and the emitter of the transistor with the diode being poled oppositely to the base-emitter junction of the transistor for conducting in an opposite current direction. The dotted end of feedback winding portion 16 is coupled through capacitor 44 and inductance 46 to the base of transistor 40 while the center tap of winding 16–18 is grounded. The remaining terminal of winding portion 18 is coupled through resistor 48 and coupling capacitor 50 to the input of high gain DC amplifier 52.

The input of the amplifier 52 is also returned to ground through capacitor 54 and through resistor 56 to a positive voltage point. Resistor 48 in combination with capacitor 54 provide a phase shifting circuit employed for purposes hereinafter more fully described. A resistor 58, shunted by the series combination of resistor 60 and capacitor 62, connects terminal 30 to the input of amplifier 52. Resistors 58 and 56 provide a feedback voltage divider forming a part of a negative feedback, voltage control loop.

The voltage control loop includes the aforementioned high gain amplifier 52, the coupling circuit 48–50, and capacitor 54. The amplifier 52 operates to provide a current for turning off transistor 40 whenever the amplifier input voltage $V_5$ is negative. When amplifier input voltage $V_5$ is positive, output current $i_2$ of amplifier 52 is zero.

Figure 2:
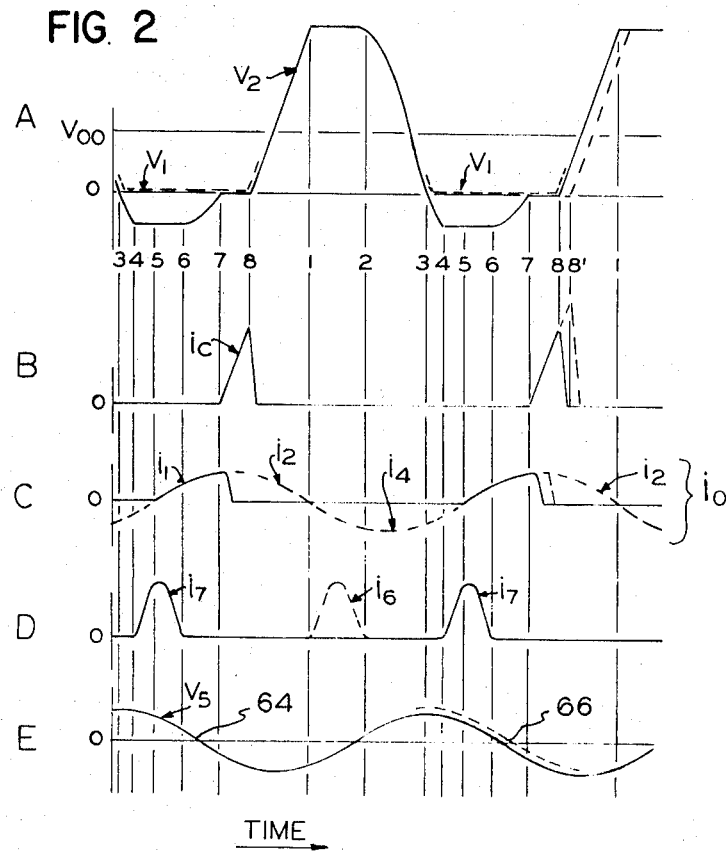

The amplifier input voltage $V_5$, illustrated at E in FIG. 2, consists of a nearly sinusoidal component 64, derived from winding portion 18, superimposed on a DC level, derived from output terminal 30, and a positive reference voltage supplied by voltage divider 58–56. A decrease in high voltage at terminal 30 causes $V_5$ to move positively as indicated by the dashed curve 66 in FIG. 2. This delays the time when $V_5$ becomes negative for turning transistor 40 off.

Considering operation of the overall circuit, consider the waveforms A through E in FIG. 2. Let us assume initially that transistor 40 is turned off. During the time period 8–1, the voltage $V_2$ at A in FIG. 2 is swinging positively, driven by energy stored in transformer 10. At time 1, secondary winding 14 reaches the voltage to which capacitor 24 is charged, and diode 20 begins to conduct. A current $i_6$ flows as illustrated in dashed lines at D in FIG. 2. During period 1–2, inductive energy is discharged into capacitor 24, and diode 20 stops conducting. The voltage $V_2$ swings negatively during time 2–3, and diode 20 reverse biases. The voltage $V_2$ swings further negatively between times 3 and 4 toward the voltage to which capacitor 26 is charged, and diode 22 then conducts as indicated in the time period 4–6 at D in FIG. 2. The current through diode 22 at this time is indicated as $i_7$.

During the period 1–5, the current $i_0$ from the dotted end of winding portion 16 has been flowing as $i_4$ through diode 42. The currents are illustrated at C in FIG. 2. At time 5, the current $i_0$ becomes positive, and flows as $i_1$ into the base of transistor 40. However, the voltage $V_2$ at the undotted end of winding 12 is negative at this time, and hence no substantial conduction takes place through diode 38 and transistor 40. Thus the switching device comprising transistor 40 remains nonconducting. It will be noted that the overall waveform of the current $i_0$ is delayed in phase with respect to the phase of a voltage $V_3$ as a result of the action of inductance 46.

After the negative swing of $V_2$ and the storage of energy in capacitor 26, diode 22 stops conducting at time 6 and $V_2$ starts to swing positively. $V_2$ reaches ground potential at time 7, and now the diode 38 permits transistor 40 to conduct. At this time, transistor 40, turned on hard at its base, is saturated, and $V_2$ remains at substantially ground level between times 7 and 8. Thus, substantially little or no power dissipation takes place in the switching element comprising transistor 40. Between times 7 and 8, the collector current, $i_c$, in winding 12 increases linearly as indicated at B in FIG. 2. This current stores energy in the transformer via winding 12, which energy is subsequently delivered as the high voltage output of the power supply.

The voltage control system including amplifier 52 shuts off transistor 40 after sufficient energy has been stored for maintaining the high voltage output. A current $i_2$ flows in the amplifier output such that current $i_0$ no longer flows into the base of transistor 40. When the transistor 40 is shutoff, the voltage $V_2$ begins to swing positively. Shutoff of the transistor takes long enough that a delay is seen to exist between the flow of $i_2$ and shutoff of transistor 40, e.g., at time 8.

Further considering the operation of the negative feedback control loop including amplifier 52, it will be appreciated that the voltage $V_4$ at the undotted end of winding portion 14 will be substantially in phase with voltage $V_2$. The circuit principally comprising resistor 48 and capacitor 54 produces a current $i_8$ nearly in phase with the voltage $V_4$. Then, the voltage $V_5$ across capacitor 54 lags the voltage $V_2$ by substantially 90°. The phase of voltage $V_5$ is appropriate for turning off amplifier 52. As the DC level at terminal 30 becomes more positive, indicating too low an output voltage, the voltage $V_5$ will cross the zero axis in a negative direction at a relatively later time as illustrated at 66 whereby more energy is delivered to the transformer via transistor 40 before transistor 40 is shutoff, e.g., at time 8' instead of 8, thereby bringing about an increase in the output voltage. Should the output voltage become too highly negative, the voltage $V_5$ will, of course, cross the zero axis in a negative direction sooner, and shorten the time during which transistor 40 delivers energy to the transformer. Thus, the time period 7–8 is adjustable in response to the output voltage for bringing about a desired correction in negative feedback fashion. As will be seen, feedback in the present circuit continues for a predetermined time during each cycle of operation of the oscillator, and is concluded during each cycle at a point in time which is predetermined by the control circuit.

Several of the advantages of the circuit become apparent. Unlike conventional switching regulators, the output provided is more nearly sinusoidal in character, with the high voltage transformer 10 being allowed to swing at a rate controlled by its own tuned frequency. Capacitances are not forcibly charged, keeping switching currents, i.e., in transistor 40, low. Current waveforms are determined largely by elements such as the primary inductance of the transformer, and not by how much current a transistor switch can draw. A relatively standard or high capacitance, high voltage transformer can be employed. Although these are characteristics similar to those of a sine wave DC—DC converter, it is observed that current flow through transistor 40 takes place at substantially zero voltage. This is more characteristic to a switching mode DC—DC converter, and results in a much smaller power dissipation in the transistor, and hence a more efficient system than would be the case with a conventional sine wave oscillator.

The control loop including amplifier 52 is substantially insensitive to oscillator ripple since a relatively high amplitude AC wave is actually provided as the input to amplifier 52. Small additional AC changes due to such ripple do not deleteriously affect the operation of the circuit. No filtering is required within the amplifier, eliminating a time constant from the loop, allowing the circuit to be more stable. The overall operation of the control loop including amplifier 52 is quite predictable, the loop gain around the control loop being virtually independent of characteristics of active devices in the amplifier, but rather depending largely on passive components.

Another important advantage to the circuit relates to the employment of a voltage doubler with attendant higher voltage output. A voltage multiplying circuit such as this relies upon a voltage swing including both positive and negative excursions of similar magnitude. The present circuit, although a high efficiency switching circuit rather than a conventional sine wave oscillator, still provides a nearly sine wave output for application to winding 14. The positively and negatively going output advantageously provides a suitable input to the voltage doubler, including capacitors 24 and 26, for producing a high voltage DC output. The diode 38 is of importance in providing an excursion in voltage $V_2$ in both positive and negative directions, and also diode 38 is of importance in impeding conduction in transistor 40 until the time at which the voltage across transistor 40 is substantially zero. Then, as current is supplied through winding 12 to transistor 40, the voltage drop thereacross will remain zero with attendant advantages mentioned above, until sufficient energy has been provided to the transformer.

The circuit according to the present invention further includes an advantageous runaway protection circuit including a diode 68 in series with a Zener diode 70, this combination being interposed between the undotted end of winding 12 and the junction between capacitor 44 and inductance 46. The anode of diode 68 is connected to the junction between elements 44 and 46, while the anode of Zener diode 70 is connected to the undotted end of winding 12. In the case of failure of the control loop in such a way that turn off current to transistor 40 is not available, the oscillator would normally tend to run away, generating a very high output voltage. However, if $V_2$ tends to swing too far below ground, Zener diode 70 conducts and charges capacitor 44 in a direction to reduce the base drive available to transistor 40. Thus, an auxiliary control loop is provided which prevents too great a build up in the oscillator output.

While I have shown and described a preferred embodiment of my invention, it will be apparent to those skilled in the art that many changes and modifications may be made without departing from my invention in its broader aspects.

I claim:

1. In a regulated oscillator circuit including means for providing feedback,
   a switching means for switching a current to an output means,
   first means timed for applying said feedback to said switching means for enabling turn on of said switching means during given half-cycles of oscillator operation, and including second means further adapting said switching means to conduct in response to the feedback after the voltage provided for application across the said switching means has swung to a substantially zero value, so that said switching means then conducts a current with substantially zero voltage thereacross for a period of time during said given half-cycles.
   and control means responsive to the output level of said oscillator circuit for turning off said feedback and concluding the conducting period in which the switching means has substantially zero voltage thereacross, allowing the voltage across said switching means to rise at a selected time during said given half-cycles of operation, said time being variable with respect to the time of turn on of said switching means and dependent upon said output level.

2. The circuit according to claim 1 wherein said control means for turning off said feedback and concluding said conduction in said switching means includes means for detecting a DC level in response to an output level of said oscillator circuit, and means for applying a value proportional to said DC level in combination with a waveform related to an AC signal output of said oscillator circuit, but different from said feedback, for concluding said feedback at a selected time during each cycle of operation of said oscillator circuit when the level of the combined waveform reaches a predetermined value, without substantially changing said feedback before the level of the combined waveform reaches said predetermined value.

3. In a regulated oscillator circuit:
   a switching means for switching a current to an output means,
   means timed for applying feedback to said switching means to turn on said switching means during given half-cycles of oscillator operation,
   unilateral conductor means in series with said switching means for causing the voltage across said switching means to reach a predetermined value and for allowing said switching means to conduct current of a predetermined polarity after the voltage applied to the switching means via the unilateral conductor means has swung substantially to zero, adapting said switching means then to conduct a current with substantially zero voltage thereacross, said feedback enabling conduction of said current of said predetermined polarity in said switching means,
   and control means responsive to the output level of the oscillator circuit for turning off said feedback and concluding said conduction in said switching means while allowing the voltage across said switching means to rise at a selected time during said given half-cycles of operation of the oscillator circuit, said control means inhibiting said feedback at such selected time, said time being variable with respect to the time of turn on of said switching means and dependent upon said output level.

4. The circuit according to claim 2 including a transformer having a primary winding through which current from said switching means flows, a feedback winding on said transformer forming a part of said means for applying feedback and coupled for operating said switching means, and an output winding on said transformer, said transformer providing nearly sinusoidal voltages,
   and rectification means coupled to said output winding, said rectification means providing said DC level for application in conjunction with said waveform related to said AC signal output for shutting off said switching means by concluding said feedback.

5. The circuit according to claim 4 wherein said rectification means comprises voltage multiplier means.

6. The circuit according to claim 4 including further control winding means on said transformer for developing said waveform which is combined with said DC level and employed for shutting off said switching means.

7. The circuit according to claim 4 wherein said switching means comprises a transistor.

8. The circuit according to claim 7 further including a diode connected across the base emitter junction of said transistor in the reverse polarity to said base emitter junction,
   said transistor receiving its input from said feedback means at the base thereof.

9. The circuit according to claim 8 wherein said feedback means includes an inductance between said feedback winding and the base of said transistor.

10. The circuit according to claim 7 further including a Zener diode connected in series with an oppositely poled diode between said primary winding and the base of said transistor, the circuit further including a capacitor between said feedback winding and the base of said transistor.

11. The circuit according to claim 6 wherein said switching means comprises a transistor and said control means further comprises an amplifier having its output coupled to a control electrode of said transistor and its input coupled to receive said DC output level and a phase shifted signal from said control winding means.

12. The circuit according to claim 1 wherein said first means timed for applying feedback applies said feedback prior to the voltage for application to the switching means swinging to said substantially zero value.

13. The circuit according to claim 12 including a transformer having a primary winding through which current from said switching means flows, said means for applying feedback including a feedback winding on said transformer coupled for operating said switching means and including an inductance between said feedback winding and said switching means.

14. The circuit according to claim 13 further including a capacitance in series with said inductance.

15. The circuit according to claim 4 wherein said control means receives said waveform related to said AC signal output from said transformer, and including phase shift means for changing the phase of said waveform for application in conjunction with said DC level for shutting off said switching means.

16. In a regulated oscillator circuit, a switching means for switching current, a transformer having a primary winding through which current from said switching means flows, a feedback winding on said transformer, and an output winding on said transformer, means for applying feedback from said feedback winding for enabling turn on of said switching means during given half-cycles of oscillator operation, said turn on occurring after the voltage for application across the switching means has swung substantially to a zero value adapting said switching means to conduct current with substantially zero voltage thereacross.

and control means responsive to the output level of said oscillator circuit for turning off the feedback and concluding conduction of the switching means while allowing voltage across the switching means to rise at a selected time during the given half-cycles of operation of the oscillator circuit, including means for receiving a DC level in response to the output level of the oscillator circuit, means for applying a value proportional to said DC level in combination with a waveform related to an AC signal output of the oscillator circuit, and including means for shifting the phase of said waveform.

17. The circuit according to claim 16 further including an additional winding means on said transformer from which said waveform is derived.

18. The circuit according to claim 17 including amplifier means for amplifying said combination of said value proportional to said DC level and the phase-shifted waveform for application to said switching means for concluding said feedback.

* * * * *